United States Patent [19]

Bagdasarian

[11] Patent Number: 5,094,887
[45] Date of Patent: Mar. 10, 1992

[54] METHOD OF SPRAYING A MIXTURE OF POLYOL RESIN, METHYLENE DIPHENYL DIISOCYANATE, CORK FLOUR, AND A SOLVENT ONTO A SURFACE HAVING A PRIMER COAT SO AS TO FORM AN ABLATIVE COATING

[75] Inventor: Samuel L. Bagdasarian, Kissimmee, Fla.

[73] Assignee: Raytheon Company, Lexington, Mass.

[21] Appl. No.: 750,780

[22] Filed: Aug. 22, 1991

Related U.S. Application Data

[60] Continuation of Ser. No. 596,645, Oct. 10, 1990, abandoned, which is a division of Ser. No. 360,616, Jun. 2, 1989, Pat. No. 4,983,667.

[51] Int. Cl.$^5$ ............................................. D05D 1/32
[52] U.S. Cl. ....................................... 427/282; 427/302; 427/340; 427/385.5; 427/407.1; 427/421
[58] Field of Search ............ 427/282, 302, 340, 385.5, 427/407.1, 421

[56] References Cited

U.S. PATENT DOCUMENTS

| | | | |
|---|---|---|---|
| 3,607,354 | 9/1971 | Krogh et al. | 427/170 |
| 3,607,513 | 9/1971 | Samson | 156/181 |
| 3,619,306 | 11/1971 | Berthmann | 149/18 |
| 3,761,047 | 9/1973 | Mao | 117/5.3 |
| 4,431,697 | 2/1984 | Rolinski et al. | 428/242 |

*Primary Examiner*—Shrive Beck
*Assistant Examiner*—Benjamin L. Utech
*Attorney, Agent, or Firm*—Christopher L. Maginniss; Richard M. Sharkansky

[57] ABSTRACT

A sprayable ablative coating formulation comprises a combination of a polymeric resin, a curing agent, cork flour and a vehicle such as toluene. The mixture is sprayable using conventional spray equipment. The surface to be coated is first sprayed with a primer to improve adhesion, and the mixture is then sprayed over the primed surface until a desired thickness if formed. Once cured, the coating has a uniform fine texture and thickness, providing thermal insulation for the coated surface. Pigments may be added to the formulation to achieve specified coloration of the coating.

16 Claims, 1 Drawing Sheet

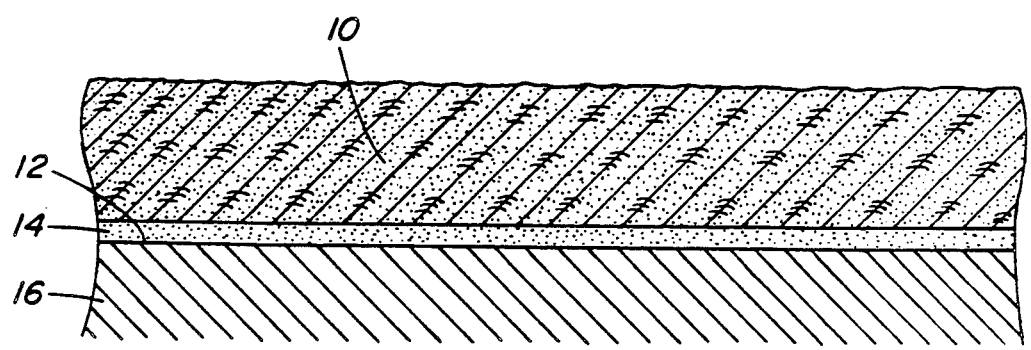

5,094,887

METHOD OF SPRAYING A MIXTURE OF POLYOL RESIN, METHYLENE DIPHENYL DIISOCYANATE, CORK FLOUR, AND A SOLVENT ONTO A SURFACE HAVING A PRIMER COAT SO AS TO FORM AN ABLATIVE COATING

The Government has rights in this invention pursuant to Contract No. N00030-84-C-0036 awarded by the Department of the Navy.

This application is a continuation of U.S. patent application Ser. No. 07/596,645, filed Oct. 10, 1990, now abandoned, which is a divisional of Ser. No. 360/616 filed Jun. 2, 1989 now U.S. Pat. No. 4,983,667.

BACKGROUND OF THE INVENTION

This invention relates generally to thermal protective layers and, more particularly, to a thermal protective layer suitable for protection of heat-sensitive apparatus within a missile or other aircraft against the effects of a nearby source of high intensity thermal energy.

It is known in the art that to protect a structure from a source of high thermal energy, an ablating layer is generally provided to dissipate the incident energy. Ablation is a known phenomenon by which energy incident upon an ablating material is dissipated through vaporization of the material rather than by conversion of the energy into heat. That is, during exposure to the heat energy, the material of the ablating layer is vaporized away, dissipating the incident heat energy by converting the solid material of the ablative layer into a vapor.

Thermally-protective coatings are particularly vital in areas where temperature-sensitive equipment is located in close proximity with heat-generating systems. As an example, in some aircraft, as well as in missiles, it is necessary to provide heat protection for delicate electronic assemblies which are located close to engine exhaust conduits. This protection is typically provided by a thermal insulating coating applied to the cover of the electronics assembly.

One example of a thermally protective layer is described in U.S. Pat. No. 4,431,697, "Laser Hardened Missile Casing Structure," issued Feb. 14, 1984, to E. J. Rolinski et al., for a composite missile casing which includes a pair of thermally protective layers comprising a cork composition layer, such as a cork phenolic which may in alternative configurations comprise carbon phenolic, silica phenolic, carbon nitrile or epoxy novalac coatings. Sandwiched between the pair of thermally protective layers is an adhesively bonded laser hardening barrier. The laser hardening barrier comprises a heavy metal bearing resin impregnated carbon fabric.

In most current applications, the method of applying an ablative material to a surface requiring thermal protection is by vacuum bag molding of a cork sheet to the surface. This process is extremely time consuming, expensive, and requires many hours of additional surface preparation. The molded cork sheet may require machining, sanding or grinding to achieve the desired surface finish. There may also be the need for an environmental top coat to protect the cork against moisture absorption, soiling or mechanical damage. Furthermore, there may exist many complex surface configurations requiring thermally protective layers which do not lend themselves to the vacuum bag molding process.

SUMMARY OF THE INVENTION

With this background of the invention in mind, it is an object of the present invention to provide an improved ablative protective coating.

It is a further object of the present invention to provide an ablative protective coating formulation which can be sprayed onto the surface to be protected.

These and other objects of the present invention are obtained generally by providing a blended mixture for use as a sprayable ablative thermally-insulating coating, the mixture comprising: a resin, a filler comprising cork flour, and a vehicle for maintaining the mixture suitable for spraying.

More particularly, there is disclosed the combination of a polymeric resin system and a curing agent, the polymeric resin system comprising a mixture of a polymeric resin, a filler comprising cork flour and a vehicle for making the combination suitable for spraying. In one embodiment, the polymeric resin system further includes an epoxy based pigment.

The invention is practiced by a method of providing a thermally-protective coating for a surface, comprising the steps of: (a) providing a surface having a primer coat; (b) spraying onto the surface a mixture comprising a resin, a curing agent, a filler comprising cork flour and a vehicle to make the mixture sprayable; and (c) curing the sprayed mixture at an elevated temperature.

One specific embodiment of the present invention comprises a method of providing thermal protection for a surface, the method including the steps of: (a) cleaning the surface; (b) masking the surface to expose only that area to be thermally-protected; (c) applying a coat of primer material over the exposed area; (d) spraying onto the surface area having a primer coat, a mixture comprising a resin, a curing agent, a filler comprising cork flour and a vehicle to make the mixture sprayable; (e) removing the masking material; and (f) curing the sprayed mixture at an elevated temperature. In one embodiment, an epoxy based pigment is added to the mixture to provide a desired coloration.

With this formulation, a thermal protective overcoat is achieved having the following favorable properties: it is sprayable using conventional spray equipment, it may be deposited on the surface to be protected in thicknesses up to 0.3 inch without sagging, it cures at moderate temperatures, it remains flexible, it adheres well to the surface, and it does not revert back to its precured condition when subjected to long periods of high levels of humidity.

BRIEF DESCRIPTION OF THE DRAWING

The foregoing features of the present invention, and the advantages thereof, may be fully understood from the following detailed description, read in conjunction with the accompanying drawings, wherein:

The sole FIGURE is a cross-sectional view of a thermal protection layer according to the principles of the present invention.

DESCRIPTION OF THE PREFERRED EMBODIMENT

A formulation according to the preferred embodiment of the present invention comprises a blend of a resin, a curing agent, a filler comprising cork flour and a vehicle to make the mixture sprayable. This formulation, when sprayed onto a surface and cured, provides an ablative, thermally-insulating coating for the surface so coated.

The resin may illustratively comprise a polymeric resin, such as polyol. A curing agent for use in a polymeric resin may illustratively comprise a hardener such as methylene diphenyl diisocyanate. The resin and hardener may comprise a two component polyurethane resin system of the type sold in kit form as Uralane 7756 A/B by Furane Products Co., Los Angeles, Calif. The resin may alternatively comprise a silicone resin.

The cork flour comprises uniformly ground prime new cork, virgin granulated from clean super select cork not previously used. It is free of foreign matter, dust and resinous cork substances. The moisture content of the flour is no greater than three percent. The particle size of the cork flour is such that 14-22 percent fines will be retained on a 200 mesh screen after agitation for approximately ten to twelve minutes. Before the cork flour is measured for use in the formulation of the present invention, it is dried by placing it in a shallow pan in an oven at approximately 95° C. for a period of from three to five days. After being allowed to come to room temperature, the density of the cork flour is measured. The cork flour is acceptable for use in the disclosed formulation if it has a density (after drying) of between 11.0 and 11.5 lb/ft$^3$ (0.176 to 0.184 gram/cm$^3$). It is permissible to blend higher and lower density flours to achieve the required density.

The vehicle used to make the mixture sprayable is a solvent which provides the proper viscosity of the blend, and may illustratively comprise reagent grade toluene.

A color pigment may be added to the mixture to achieve a desired coloration of the coating. A preferred pigment may comprise a one part epoxy based pigment that is compatible with urethane resin systems. An illustrative white epoxy pigment, suitable for use in the ablative coating of the present invention, is sold as Part No. PMS 175 JED by PMS Consolidated, Somerset, N.J. An illustrative blue epoxy pigment is Part No. PMS 3000 JED, sold by the same vendor.

In a preferred method of blending the ingredients of the mixture, the resin, pigments, cork flour and toluene are mixed and stored as a liquid thermal insulating resin system for later blending with the liquid curing agent at a time when the total mixture is to be applied to a surface. The resin system is formulated by adding the pigments to the polyurethane, then adding the toluene and then the cork flour, mixing completely after each addition. The quantities of resin, pigments, toluene and cork flour are substantially in the proportion of 8:3:4.75:4.5, respectively, by weight. This system is subsequently blended with the curing agent wherein substantially four parts of the system are mixed with one part of curing agent, by weight. The viscosity of total mixture, thus formulated, is such that the mixture may be applied by spraying using conventional spray techniques and spray equipment. If it is necessary to thin the mixture to improve sprayability, additional amounts of toluene may be added.

According to a preferred application method, the result of which is illustrated in the sole FIGURE, the surface 12 to be coated is initially cleaned using techniques known in the art. These techniques may illustratively include vapor degreasing and solvent cleaning. In addition, it may also be desirable to prepare surface 12 by gritblasting using, for example, aluminum oxide particles. If less than the entire area of surface 12 is to be thermally protected, surface 12 is then masked to expose only those areas to be thermally protected, using, illustratively, vinyl-backed masking tape as a masking material. The cleaned and exposed (not masked) surface 12 is then coated, typically by spraying, with a primer 14 to improve the adhesion of the sprayed ablative coating 10 to the substrate 16. An illustrative primer 14 may comprise an epoxy-polymide. After the primer coat 14 is cured, it may be solvent cleaned using, for example, isopropyl alcohol.

The total mixture including resin, pigments, toluene, cork flour and curing agent is sprayed onto the prepared surface using conventional spray techniques and spray equipment. The sprayed coating 10 may be applied to any required thickness, typically up to 0.15 inch (3.8 mm) in a single application, and the thickness can be varied from one surface to another during application, depending on the requirement for thermal protection. The coating 10 may be sprayed onto the surface in one continuous application; alternatively, it may be sprayed in a number of discrete layers to achieve significant thicknesses.

After curing at room temperature for several hours, illustratively 16 hours, the masking material is removed and the sprayed cork ablative coating 10 is heated, typically in an oven at between approximately 150° F. and 200° F. (66° C. and 93° C.) for approximately four hours. The final cured coating 10 is thermally-insulating and has ablative properties. In addition, coating 10 has a uniform fine texture and thickness. The fine texture eliminates the need for an environmental overcoat to protect the coated surface from the absorption of moisture. It also eliminates the need for machining, sanding or grinding to achieve the desired surface finish.

The example which follows represents a specific process for formulating and mixing a thermal insulation coating having a light blue coloration, according to the principles of the present invention.

EXAMPLE

The ingredients of the formulation of this example are accumulated as follows:

a) polymeric resin and hardener system in a kit form as hereinbefore described;
b) Blue and white epoxy based pigments compatible with urethane resin systems;
c) Cork flour having a dried density of between 11.0 and 11.5 lb/ft$^3$ and further specified as hereinbefore described; and
d) Reagent grade toluene.

The following quantities of the above ingredients are mixed in an ambient environment having temperature between 60° F. and 80° F. (16° C. and 27° C.), and a relative humidity of less than fifty percent. Although specific quantities (by weight) are given for each ingredient, it will be recognized that any size batch may be mixed so long as corresponding proportions are adhered to.

A quantity of 800 g of polymeric resin is placed in a mixing vessel. 150 g of blue epoxy pigment and 150 g of white epoxy pigment are added to the vessel and the vessel contents are mixed using a power mixer until a uniform color is achieved, but not for more than fifteen minutes. 475 g (550 ml) of toluene is added to the mixture in the mixing vessel and mixed until uniform, but not for more than five minutes.

Within two hours after the density determination of the dried cork flour has been made, 450 g of cork flour is added to the mixture and stirred until the mixture is homogeneous, but not for more than twenty minutes. Although the above procedure is preferred, the order of adding of the toluene and cork flour may be reversed in an alternative procedure. The above mixture comprises a resin system which is, in a subsequent step, combined with the hardener to form a sprayable thermal insulation.

The surfaces to be coated are then prepared in the following manner in an ambient temperature between 60° F. and 85° F. (16° C. and 29° C.), and a relative humidity of not more than 65 percent. If gritblasting is required on some surfaces, all other surfaces are masked to provide protection therefrom by vinyl-backed masking tape. Gritblasting is accomplished by using aluminum oxide, 30 mesh, at 70 lb/in² pressure. After gritblasting, the masking tape is removed. The gritblasted surfaces must be immediately covered to protect them from airborne contamination and they must be primed within 48 hours; otherwise, the surfaces must be gritblasted again.

Prior to application of the primer coat, all surfaces to be coated are cleaned, typically by vapor degreasing or solvent cleaning. Surfaces to be excluded from the thermal insulating coating are then masked using a vinyl-backed masking tape. A primer, which in this example comprises yellow epoxy-polymide, is sprayed on the surface to be coated so as to provide a uniform continuous coverage to a wet film thickness of between 0.001 and 0.002 inch (0.025 to 0.051 mm). It will be noted that the average resultant cured film thickness of primer is approximately 0.0007 inch (0.018 mm).

The spray deposited primer is allowed to dry at room temperature for at least 12 hours prior to application of the thermal protection coating, but not for more than 14 days. The cured primer coat is solvent cleaned using isopropyl alcohol and allowed to dry at room temperature for 30 minutes.

The thermal insulation mixture is then completed by mixing the resin system (formulated earlier) with the hardener in the ratio of four parts to one, respectively, by weight. The blended mixture is complete when it is of a uniform color, usually in approximately five minutes.

The thermal insulation mixture is sprayed using, illustratively, a Devilbiss EGA 502 spray gun onto the prepared and primed surface to a thickness of up to 0.15 inch (3.8 mm). The masking material is carefully removed and the coated part is placed in an oven at a temperature of 200° F. (93° C.) for four hours, at which time the coating is fully cured.

While the principles of the present invention have been demonstrated with particular regard to the combinations and methods heretofore disclosed, it will be recognized that various departures from such combinations and methods may be undertaken in the practice of the invention. The scope of this invention is therefore not intended to be limited to the particular combinations and methods disclosed herein, but should instead be gauged by the breadth of the claims which follow.

What is claimed is:

1. A method of providing an ablative coating for a surface, comprising the steps of:
   a) providing a surface having a primer coat; and
   b) spraying onto said surface a mixture comprising a polyol resin, a curing agent comprising methylene diphenyl diisocyanate, cork flour and a solvent.

2. The method according to claim 1 wherein said vehicle comprises toluene.

3. The method according to claim 1 wherein said providing step further includes spraying said primer coat onto said surface.

4. The method according to claim 1 wherein said primer coat comprises an adhesive.

5. The method according to claim 1 wherein said primer coat comprises epoxy-polymide.

6. The method according to claim 1 wherein said mixture further includes a color pigment.

7. The method according to claim 1 wherein said cork flour has an average density substantially between 11.0 and 11.5 lb/ft³ (0.176 and 0.184 gram/cm³).

8. The method according to claim 1 further including a step of accelerating the cure of said mixture comprising heating said surface for approximately 4 hours at between 150° F. and 200° F.

9. A method of providing a thermally protective, ablative coating for a surface, comprising the steps of:
   a) cleaning said surface;
   b) masking said surface to expose only that area to be thermally protected;
   c) applying a coat of primer material over said exposed area;
   d) spraying onto said surface area having a primer coat, a mixture comprising a polyol resin, a curing agent comprising methylene diphenyl diisocyanate, cork flour and a solvent; and
   e) removing the masking material.

10. The method according to claim 9 wherein said vehicle comprises toluene.

11. The method according to claim 9 wherein said applying step further includes spraying said primer material onto said surface.

12. The method according to claim 9 wherein said primer material comprises an adhesive.

13. The method according to claim 9 wherein said primer coat comprises epoxy-polymide.

14. The method according to claim 9 wherein said mixture further includes a color pigment.

15. The method according to claim 9 wherein said cork flour has an average density substantially between 11.0 and 11.5 lb/ft³ (0.176 and 0.184 gram/cm³).

16. The method according to claim 9 further including a step of accelerating the cure of said mixture comprising heating said surface for approximately 4 hours at between 150° F. and 200° F.

* * * * *